PNEUMATICALLY POSITIONED RECORD MEMBER

Filed Oct. 18, 1957 2 Sheets-Sheet 1

INVENTORS
ROBERT L. PERKINS
JOHN G. WILSON
BY Cushman, Darby & Cushman
ATTORNEYS

PNEUMATICALLY POSITIONED RECORD MEMBER

Filed Oct. 18, 1957 2 Sheets-Sheet 2

INVENTORS
ROBERT L. PERKINS
JOHN G. WILSON

BY Cushman, Darby & Cushman
ATTORNEYS

United States Patent Office 3,108,259
Patented Oct. 22, 1963

3,108,259

PNEUMATICALLY POSITIONED RECORD MEMBER

Robert L. Perkins, St. Paul, and John G. Wilson, Minneapolis, Minn., assignors to Sperry Rand Corporation, New York, N.Y., a corporation of Delaware Filed Oct. 18, 1957, Ser. No. 690,958
12 Claims. (Cl. 340—174.1)

This inventioin relates generally to pneumatic positioning of a magnetic record member. More specifically, it relates to utilizing porous material to effect an equal distribution of air pressure onto a record member whereby the record member is maintained at a given distance from the porous material and any transducers held thereby even though the record member may be moving. It also relates to magnetic memory devices usable in digital computers, and in greater particular, to magnetic disc memory apparatus utilizing pneumatic positioning principles.

In conventional magnetic drum memories, the information storage capacity is limited by the diameter of the drum and the resolving power of the transducing head. To improve the resolving power of the transducing head, the gap between the head and the recording surface must be made very small. As the air gap is decreased, problems caused by internal or external disturbance such as mechanical shock, thermal shock, and vibration become increasingly greater.

In a specific embodiment of the present invention, a circular flexible disc coated on both sides with a suitable magnetic material, i.e., a magnetic substance having essentially square hysteresis loop characteristics, is made to revolve in an air chamber under pneumatic forces which maintain said disc in a mutually fixed relationship with the surfaces of the air chamber. This invention also provides a means of interchanging the magnetic discs so that the storage capacity of the memory is limited only by the size of the record library.

It is accordingly an object of the present invention to provide an improved, disturbance-proof, record housing wherein information may be read from or recorded on any one of an unlimited number of records un-erringly with extremely high resolving power.

Another object of this invention is the provision of porous material as part of a pneumatic chamber whereby air is distributed throughout the chamber and exuded through the porous material with an even distribution of air pressure onto a given area of a record member whereby the record member is maintained at a predetermined spaced position from the porous material.

A further object of this invention in conjunction with the preceding object is the provision of transducing means held by the porous material with the exuded air maintaining the record member at a given noncontacting relationship with the transducing means but with the resolving power thereof being extremely high.

Still another object of this invention is the provision of a magnetic memory assembly in which the record member is maintained in a given position pneumatically but can be removed and replaced by another record member having different information thereon.

A still further object of this invention is to provide a pneumatically positioned record memory assembly in which vibration or shock have little or no effect.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 3:
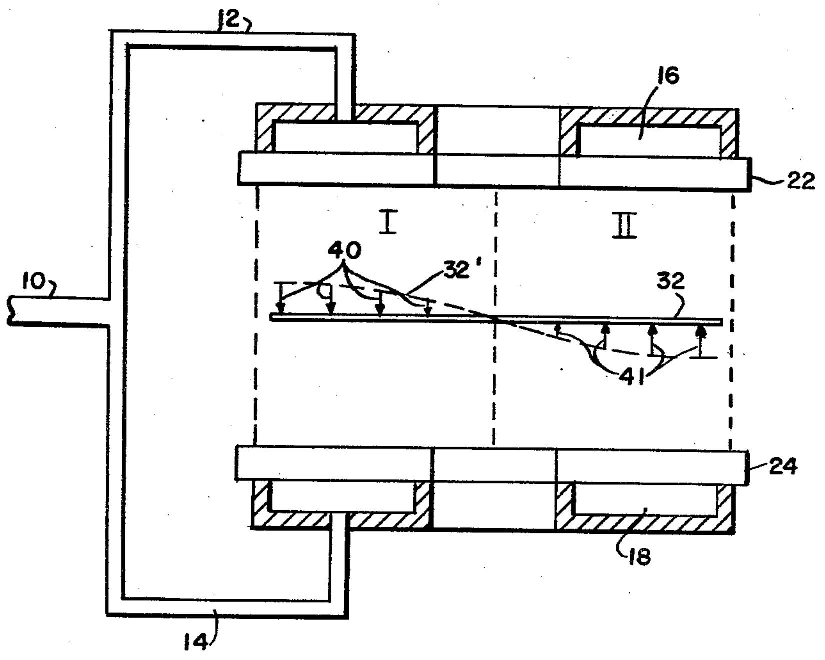
Figure 4:
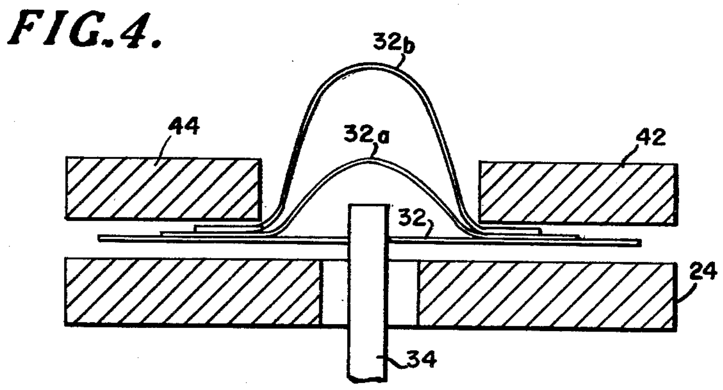

FIGURE 3 schematically illustrates the vectorial force distribution acting on the record member when displaced from its equilibrium position, and FIGURE 4 illustrates a modification by which a flexible record member may be inserted or removed from its pneumatic housing.

Figure 1:
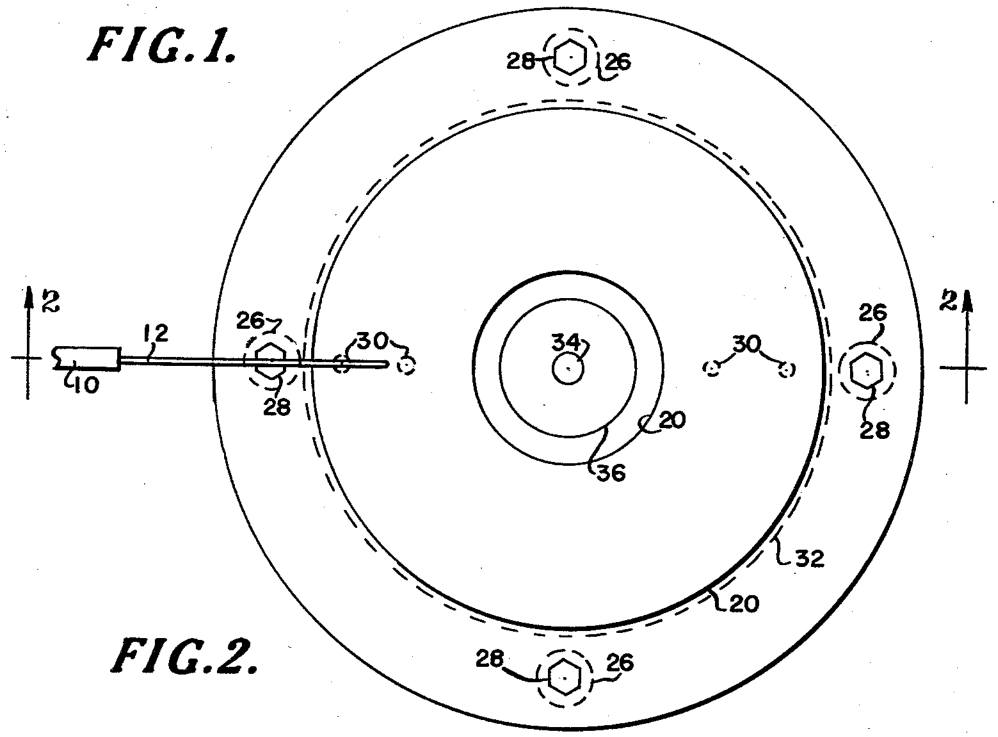
FIGURE 1 illustrates a plan view of a magnetic memory assembly.
Figure 2:
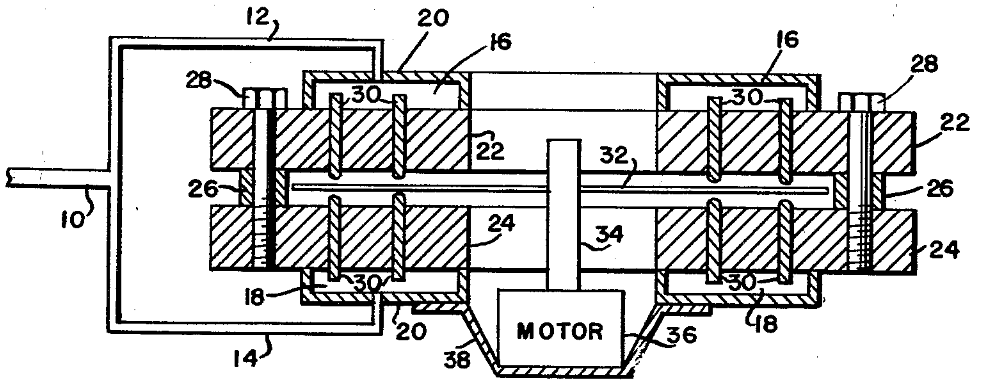
FIGURE 2 is a cross-sectional view of FIGURE 1 taken along the line 1—1.

FIGURES 1 and 2 show a specific embodiment of the invention wherein air is supplied to a tubular inlet connection 10 from means (not shown) such as a pump or compressed air source under suitable pressure and at a suitable rate. Inlet 10 is bifurcated into two branch tubes 12 and 14 which extend into annular manifolds or pneumatic chambers 16 and 18 respectively. These chambers each includes a squared U-shaped annular plate 20 bounded on their opened sides by porous members such as discs 22 and 24 respectively. These porous discs are maintained at a given distance apart by spacers 26 held in position relative to the discs by bolts 28.

Either or both of the porous discs 22, 24 may carry transducing heads 30, any of which may be employed to read or write information on a disc-shaped record member 32. The record member is suitably held in a central position at its center by shaft 34 which is turnable by motor 36. The motor may be held in a given position relative to chamber 18 by any suitable means and bracket 38 is shown for this purpose.

Spacers 26 are of such dimension that the porous discs 22 and 24 are separated from each other by a distance approximately equal to twice the normal transducer-to-record member surface distance plus the thickness dimension of the record member. The record member 32 is preferably a flexible disc such as a film of polyethylene terephthalate resin (e.g. such as that sold under the trademark "Mylar") coated on both sides with a magnetic material possessing square hysteresis loop characteristics.

In operation, the air caused to flow in tubes 12 and 14 and into chambers 16 and 18, is met by porous members 22 and 24. Even though pervious to air, these porous members 22 and 24 have sufficient resistance to air to cause the air to be distributed within each of the chambers, respectively, so that each minute area of the porous members exudes air at the same pressure onto the flexible record member 32. The areas of the record member directly beneath and above the chambers consequently receive equal and uniform distributions of air because of the symmetrical design of the housing as a whole.

One of the greatest advantages of apparatus constructed in accordance with this invention is that internal or external disturbance such as shock or vibration applied to the assembly does not destroy the equilibrium condition of the record member. That is, if an external force tends to displace the record member 32 in one direction on one side of shaft 34 and in an opposite direction on the other side of the shaft 34 as shown by dotted line 32′ in FIGURE 3, the incremental changes in volume above and below the flexible record member produce corresponding incremental pressure changes which tend to prevent or quickly return the record member to its central or equilibrium position. Stated otherwise, if the record member 32 begins to be displaced or is actually displaced as shown by dotted line 32′, the pressure builds up rapidly in the decreased volume area I between the chambers and above the record members with the downward forces illustrated by vectors 40 returning the area I part of the record member to equilibrium. Conversely, the pressure reduces in the increased area II so that strong restoring or resisting forces illustrated by vectors 41 react to maintain the disc in its central position. It is consequently apparent that record member 32 may rotate in a plane equidistant between the two porous members 22, 24 as long as the air is supplied to chambers 16 and 18 under equal pressures and rates of flow so that equal and opposite pneumatic forces will be applied to each side of the record member. The individual forces so applied are equal in magnitude to the product of the air pressure and the surface area on one side of the record member. The magnitude of the force vectors 40 and 41 are a function of the displacement of the flexible record member 32 from its equilibrium position and consequently tend to restore the record member to such a position.

From the foregoing, it is apparent that the apparatus of this invention takes on the characteristics of a positional servo-mechanism in that a displacement of the record disc from its equilibrium position acts as an error signal, and upon detection of this error signal by the device, forces are set up which tend to reduce this signal to zero.

The porous discs 22 and 24 preferably have a porosity of around 20%; that is, about 20% of the volume is made up of orifices. The porosity may vary, however, considerably above and below 20% in accordance with the air pressure and rate of flow in inlet 10. For example, less porosity, say 10%, can be used if the air pressure is increased, or greater porosity may be used by increasing the air flow rate. The 20% porosity value is particularly preferred when the porous discs 22 and 24 are made of a conventional sintered powdered bronze alloy, such as that manufactured and sold by the Chrysler Corporation under the trademark "Oilite" and commonly used for oil bearings. "Oilite" as it may be employed in this invention is an air bearing which is relatively inexpensive and needs no further treatment to provide equal resistance to air throughout each of the annular chambers 16 and 18, and to cause an even distribution of air pressure of the air which exudes over all its chamber surface onto the record member.

As an example, without limitation intended, the discs 22 and 24 may each be composed of a bronze alloy containing tin ranging from 8 percent–70 percent, with or without lead (for example, 25% lead may be used with 25% tin), the remainder copper, all in a sintered powdered structure giving the porosity desired for the pressure and flow rate employed. Also, each such disc may be ¾ inch thick and 19 inches in diameter with the record members being 18 inches in diameter and encoded so that there are approximately 80 binary characters or bits per inch located in numerous circumferential rows around each side of each record member. The record members may be driven at a speed of 2200 r.p.m. Suitable air is supplied under ½ p.s.i. at 75 c.f.m.

From FIGURES 1 and 2 and the foregoing, it can be appreciated that it is a relatively simple operation to remove a given record member from the positioning apparatus and replace it with another record member having different information thereon by merely removing bolts 28 and porous member 22 and sliding a new record member into position. By providing a digital data processing and computing system with a memory having this feature of interchangeability of record media without the sacrifice of any advantageous characteristics of a conventional magnetic drum, it is possible to realize large cost savings over systems using the magnetic drum as its storage device. A particular application in which considerable economy can be achieved is in a computer system wherein the diversity of operations is such as to normally require a number of drums, one or more of which may be in use only when a particular type of operation (such as a payroll calculation) is to be performed infrequently; in this situation, the customer can employ any one of a plurality of interchangeable discs in the same mounting structure, rather than being obliged to maintain several complete drum systems each requiring permanent driving means, head mountings, etc., of its own.

Another method of removing and/or inserting a flexible magnetic record member onto shaft 34 of FIGURE 1 is shown in FIGURE 4. In this variation the upper porous member 22 of FIGURE 1 is changed so that it is no longer annular but consists of two strips 42 and 44 along opposing sides of the record member with a separation distance between the interfaces of porous strips 42 and 44 being sufficient to allow the flexible member 32 to be progressively bent in the manner shown by lines **32*a* and 32*b***. Numerous recording members can therefore be removed from or inserted into the pneumatic housing with a minimum of difficulty.

Although the specific embodiment herein discussed is annular, it is obvious that the housing and record member may take any other shape. The record member need not be under opposing pressurized air sources throughout its length, but it is sufficient if the record member is passed between such air sources while reading or writing in the air source vicinity occurs.

Thus it is apparent that there is provided by this invention systems in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings, be interpreted as illustrative and not limitative, the scope of the invention being defined in the appended claims.

What is claimed is:

1. Apparatus comprising a record member flexible in its entirety; chamber means composed at least partially of porous-material portions pervious to air, said porous-material portions being disposed on opposite sides of the record member and adjacent thereto, the surfaces of the porous-material portions facing the record member being depressionless; means for supplying pressurized air into the chamber means, said porous-material exuding the air from throughout its chamber area such that the pressure distribution is uniform upon opposite sides of the record member for causing the record member to be held by the exuded air at a spaced position from said porous-material surfaces.

2. Apparatus as in claim 1 wherein said porous material is a sintered powdered metal.

3. Apparatus for holding a movable record member in mid-air comprising a record member flexible in its entirety, two pneumatic chambers each composed at least partially of porous material pervious to air, said chambers being disposed on opposite sides of the record member with the porous material thereof being adjacent the record member, the sides of the porous material facing the record member being depressionless, means for supplying air into each of the chambers with controlled pressures, the porous material of each of the chambers exuding the air from throughout its area with uniform pressure distribution onto each side of the record member, the arrangement being such that the record member is held in a given position between said chambers at all times during the receipt by the chambers of the pressurized air.

4. Apparatus as in claim 3 wherein said porous material is a powdered sintered metal.

5. Apparatus as in claim 3 and further including transducer means disposed in said porous material extending into the space between the chambers to a given minute distance from the record member, the arrangement being such that any external force tending to move the record member from its given position is counteracted by the exuded air which maintains said given distance between the record member and the transducer means constant.

6. Apparatus for holding a movable record member in mid-air comprising a record member having a disc shape and being completely flexible, means to rotate said record member, two chamber means at least one of which is an annular chamber, each chamber means being at least partially composed of porous material pervious to air, said chamber means being disposed near the record member with the porous material thereof being adjacent to the record member, the sides of the porous material facing the record member being depressionless, means for supplying pressurized air to each of the chamber means under substantially equal pressures, said porous material acting to distribute the air throughout each of the chamber means and thereby exuding the air from throughout the area of the porous material with a controlled pressure distribution onto each side of the record member, the arrangement being such that the record member is constantly held at a given position between said chamber means.

7. Apparatus as in claim 6 and further including transducing means disposed in said porous material and extending toward said record member so as to be at a given distance therefrom, the arrangement being such that regardless of any disturbing force tending to move the record member out of said given position, the distance from the record member to said transducing means remains constant.

8. Apparatus as in claim 7 wherein said means for rotating the record member includes a shaft to which the record member is removably attached, one of the chamber means being non-annular and comprising two separate chambers spaced a given distance apart, the arrangement being such that the record member may be removed from and inserted on said shaft between said two chambers to said given position.

9. Apparatus as in claim 2 wherein said metal is a bronze alloy.

10. Apparatus as in claim 3 wherein the air supplying means supplies air into each of said chambers with equal pressure.

11. Apparatus as in claim 4 wherein said metal is a bronze alloy.

12. Apparatus as in claim 6 wherein the porous material for each of said chamber means distributes the pressurized air substantially evenly throughout its chamber means and exudes the air on to opposite sides of the record member with a substantially uniform pressure distribution.

References Cited in the file of this patent

UNITED STATES PATENTS

| | | |
|---|---|---|
| 2,696,410 | Topanelian | Dec. 7, 1954 |
| 2,899,260 | Farrand | Aug. 11, 1959 |
| 2,950,353 | Fomenko | Aug. 23, 1960 |

OTHER REFERENCES

An Air-Floating Disc Magnetic Memory Unit, by W. A. Farrand, 16 pages. Copy in Div. 42.